United States Patent
Liu

(10) Patent No.: US 9,014,556 B2
(45) Date of Patent: Apr. 21, 2015

(54) OPTICAL POWER MONITORING METHOD AND APPARATUS

(71) Applicant: Huawei Technologies Co., Ltd., Shenzhen (CN)

(72) Inventor: Ning Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 14/051,647

(22) Filed: Oct. 11, 2013

(65) Prior Publication Data

US 2014/0037287 A1 Feb. 6, 2014

Related U.S. Application Data

(63) Continuation of application No. PCT/CN2011/072649, filed on Apr. 12, 2011.

(51) Int. Cl.
  *H04B 10/08* (2006.01)
  *H04B 10/079* (2013.01)
  *H04B 17/00* (2006.01)

(52) U.S. Cl.
  CPC ................ *H04B 10/07955* (2013.01)

(58) Field of Classification Search
  CPC ............ H04B 10/079; H04B 10/0795; H04B 10/07955; H04B 10/07957
  USPC ................................. 398/25, 34, 38
  See application file for complete search history.

(56) References Cited

U.S. PATENT DOCUMENTS

| 2005/0052727 | A1  | 3/2005  | Kilper et al. |
| 2006/0291775 | A1  | 12/2006 | Zeng et al. |
| 2009/0041456 | A1* | 2/2009  | Kachita et al. ................. 398/34 |
| 2013/0251365 | A1* | 9/2013  | Sone et al. ...................... 398/38 |

FOREIGN PATENT DOCUMENTS

| CN | 1881848 | 12/2006 |
| CN | 101021438 | 8/2007 |
| CN | 101552638 | 10/2009 |
| JP | 2010112808 | 5/2010 |

OTHER PUBLICATIONS

PCT International Search Report mailed Jan. 12, 2012 in corresponding International Patent Application No. PCT/CN2011/072649.

* cited by examiner

*Primary Examiner* — Daniel Dobson
(74) *Attorney, Agent, or Firm* — Staas & Halsey LLP

(57) ABSTRACT

The present invention discloses an optical power monitoring method and apparatus. The present invention includes: measuring broadened spectrums of optical signals of monitored channels after performing filtering processing on the optical signals, to obtain a measured broadened spectrum of the optical signals of the monitored channels; constructing a plurality of optical signal power combinations; performing calculation for each optical signal power combination according to a transfer function that indicates the filtering processing, to obtain its corresponding theoretical broadened spectrum of the optical signals of the monitored channels; comparing a plurality of theoretical broadened spectrums with the measured broadened spectrum to find a theoretical broadened spectrum that is closest to the measured broadened spectrum; and determining each hypothetical optical power in an optical signal power combination corresponding to the theoretical broadened spectrum as an actual optical power of an optical signal of a corresponding monitored channel.

10 Claims, 6 Drawing Sheets

Fixed frequency interval

Flexible spectrum allocation

OPTICAL POWER MONITORING METHOD AND APPARATUS

CROSS-REFERENCE TO RELATED APPLICATIONS

This application is a continuation of International Application No. PCT/CN2011/072649, filed on Apr. 12, 2011, which is hereby incorporated by reference in its entirety.

FIELD OF THE INVENTION

The present invention relates to the field of communications, and in particular, to an optical power monitoring method and apparatus.

BACKGROUND OF THE INVENTION

With the emergency of a large-capacity service, a transmission speed of an optical communication transmission network evolves from 40 Gb/s to 100 Gb/s and even 400 Gb/s and 1 Tb/s. In order to achieve a high transmission speed, various advanced modulation formats, for example, PM-QPSK (Polarization Multiplexing-Quadrature Phase Shift Keying, polarization multiplexing-quadrature phase shift keying), QAM (Quadrature Amplitude Modulation, quadrature amplitude modulation), and OFDM (Orthogonal Frequency Division Multiplexing, orthogonal frequency division multiplexing), are introduced. In another aspect, in order to improve frequency spectrum utilization of an optical fiber and flexibility of system configuration, the optical communication transmission network evolves toward a direction of a variable-bandwidth optical network, that is, a channel interval gradually changes from a fixed channel interval of 100 GHz/50 GHz to a flexibly variable channel interval. FIG. 1A shows a fixed channel interval in an existing optical communication transmission network, and FIG. 1B shows a future development trend of an optical network—a flexibly variable channel interval.

In an optical communication long-distance transmission network, an OEO (Optical-Electrical-Optical) conversion in a system link is in a decreasing trend. It becomes more and more difficult to test a bit error rate in an electrical layer, while a test of the bit error rate merely at a link terminal is not conducive to fault location. With increase of transmission capacity and improvement of flexibility in the optical communication transmission network, a system becomes more and more complex. In order to effectively control and manage an optical network, optical performance monitoring for a high-speed wavelength division multiplexing signal in the optical communication transmission network becomes more and more important. Optical power monitoring can reflect a basic working state of a wavelength channel and instruct the system to perform processing such as automatic power equalization, so that optical power monitoring becomes the most basic and most important performance monitoring content. A typical application scenario of optical power monitoring is shown in the following figure.

In the prior art, technologies for monitoring an optical power of a channel may be generally classified into two types. The first type is that a device such as a grating is used to distinguish light with different wavelengths in terms of space, and a photoelectric detector array is used to detect light intensity at different positions, so as to monitor the optical power and a wavelength of the channel at the same time. The second type is that a TOF (Tunable Optical Filter, tunable optical filter) is used to scan a band to be detected, so as to distinguish light with different wavelengths in terms of time, and then the same photoelectric detector is used to detect an optical power at different time.

In the first type of optical power monitoring technology, first, an optical signal of a certain power is extracted from a network; the optical signal is converted into parallel light after passing through a collimation lens, and the parallel light is incident into a diffraction gating at an optimal diffraction angle of the diffraction grating; after the parallel light passes through the diffraction grating, diffraction light whose diffraction efficiency is quite high is obtained, and optical signals with different wavelengths are separated; the separated optical signals are converged onto different pixels of an array detector after passing through a convergent lens, and are distributed in turn on the array detector according to a wavelength; the array detector performs real-time and rapid sampling on the optical signals, converts amplitude of the optical signals into an electrical signal to obtain original spectrum data, and transfers original data to a signal processor; and the signal processor processes and analyzes the original data, performs a deconvolution operation according to amplitude and distribution of the light intensity, so as to restore a spectrum curve and calculate an optical power of a channel of the optical signal.

In the second type of optical power monitoring technology, a certain optical power is extracted from a signal in the optical communication transmission network and transferred to the TOF; the TOF filters input optical signals, where optical signals with a certain bandwidth pass through the TOF and are introduced into a photoelectric detector; the photoelectric detector performs photoelectric conversion and samples the optical signals, converts amplitude of the optical signals into an electrical signal, and transfers the electrical signal to a signal processing and control apparatus; after receiving sampled data, the signal processing and control apparatus sends an instruction to change a pass-band wavelength of the TOF, repeats the process till a whole required wavelength range is scanned; and finally, the signal processing and control apparatus analyzes and processes obtained sampled data, and performs a deconvolution operation according to amplitude and distribution of the light intensity, so as to restore a spectrum curve and calculate an optical power of a channel of the optical signal.

A principle of calculating a channel power of an optical signal by using a spectrum line that is restored through deconvolution with two existing types of optical power monitoring technologies is introduced briefly in the following with an example. Referring to FIG. 2, FIG. 2 shows typical spectrums of measured signals, where the measured signals are three different rates and formats of signals (10 Gbps NRZ/40 Gbps DQPSK/2.5 Gbps NRZ) at an interval of 50 GHz. A solid line indicates a real spectrum measured by a high-accuracy spectrometer, a "+" symbol indicates an original broadened spectrum obtained after TOF scanning, and a dashed line indicates a spectrum restored through a deconvolution algorithm. After a broadened spectrum is obtained through a deconvolution operation, a power is summed near a peak point of a center wavelength of a channel, so that an optical power of the channel may be obtained. It can be seen from FIG. 2 that, the restored spectrum has a main peak in a place where a signal exists and also has a sidelobe in a place where no signal exists. The sidelobe needs to be distinguished from the signal. In a fixed-bandwidth optical-communication transmission network, because a center wavelength of each channel is fixed and a bandwidth difference is not great, only a main peak at a place of a center wavelength of the restored spectrum needs to be summed to obtain the optical power of the channel.

However, when the optical communication transmission network changes from the fixed-bandwidth optical-communication transmission network to a variable-bandwidth optical-communication transmission network, because a center wavelength is not fixed, a channel bandwidth is indeterminate, a modulation format is indeterminate, and a guard interval between channels is narrow, it is rather difficult to distinguish the main peak and the side-lobe in the restored spectrum to calculate the channel power, so that an error of a monitoring result that is obtained when optical power monitoring is performed by using whether the first type of the optical power monitoring technology or the second type of the optical power monitoring technology is larger, and even the optical power monitoring fails.

SUMMARY OF THE INVENTION

In view of a disadvantage of an existing technology for optical power monitoring, the present invention provides an optical power monitoring solution, so as to improve accuracy of optical power monitoring and expand an application scope of optical power monitoring.

An embodiment of the present invention provides an optical power monitoring method, which includes:

measuring broadened spectrums of optical signals of monitored channels after performing filtering processing on the optical signals, to obtain a measured broadened spectrum of the optical signals of the monitored channels;

constructing a plurality of optical signal power combinations, where each optical signal power combination indicates hypothetical optical powers of the optical signals of the monitored channels;

performing calculation for each optical signal power combination according to a transfer function that indicates the filtering processing, to obtain its corresponding theoretical broadened spectrum of the optical signals of the monitored channels;

comparing a plurality of theoretical broadened spectrums with the measured broadened spectrum to find a theoretical broadened spectrum that is closest to the measured broadened spectrum, where the theoretical broadened spectrums are obtained through calculation; and determining each hypothetical optical power in an optical signal power combination corresponding to the theoretical broadened spectrum that is closest to the measured broadened spectrum as an actual optical power of an optical signal of a corresponding monitored channel.

Accordingly, an embodiment of the present invention further provides an optical power monitoring method, which includes:

a measuring module, configured to measure broadened spectrums of optical signals of monitored channels after performing filtering processing on the optical signals, to obtain a measured broadened spectrum of the optical signals of the monitored channels;

a constructing module, configured to construct a plurality of optical signal power combinations, where each optical signal power combination indicates hypothetical optical powers of the optical signals of the monitored channels;

a calculating module, configured to, perform calculation for each optical signal power combination according to a transfer function that indicates the filtering processing, to obtain its corresponding theoretical broadened spectrum of the optical signals of the monitored channels;

a comparing module, configured to compare a plurality of theoretical broadened spectrums with the measured broadened spectrum to find a theoretical broadened spectrum that is closest to the measured broadened spectrum, where the theoretical broadened spectrums are obtained through calculation performed by the calculating module; and a determining module, configured to determine each hypothetical optical power in an optical signal power combination corresponding to the theoretical broadened spectrum that is closest to the measured broadened spectrum as an actual optical power of an optical signal of a corresponding monitored channel.

With the solutions of the present invention, the plurality of optical power combinations of the optical signals of the monitored channels is constructed, calculation is performed based on the plurality of constructed optical power combinations to obtain multiple theoretical broadened spectrums that are corresponding to the optical signals of the monitored channels, and then the plurality of theoretical broadened spectrums is compared with the measured broadened spectrum to find a theoretical broadened spectrum that is closest to the measured broadened spectrum, and each power in an optical power combination corresponding to the theoretical spectrum that is closest to the measured broadened spectrum is determined as an actual optical power of an optical signal of a corresponding monitored channel. No deconvolution operation is required to restore a spectrum of the optical signals of the monitored channels, so that a monitoring error caused by a larger difference between a restored spectrum and a real spectrum is avoided, and therefore, accuracy of optical power monitoring may be improved and a requirement for filter performance is lowered, thereby reducing a monitoring cost. Especially, the solutions are applicable in a variable-bandwidth optical-communication transmission network without a similar disadvantage that exists when the existing optical power monitoring technology is applied in the variable-bandwidth optical-communication transmission network.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art may still derive other drawings from these accompanying drawings without creative efforts.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are only a part rather than all of the embodiments of the present invention. Based on the embodiments of the present invention, all other embodiments obtained by persons skilled in the art without creative efforts shall fall within the protection scope of the present invention.

In order to make the objectives, technical solutions, and advantages of the present invention clearer, the embodiments of the present invention are described in further detail in the following with reference to the accompanying drawings.

Embodiment 1

Figure 1A:
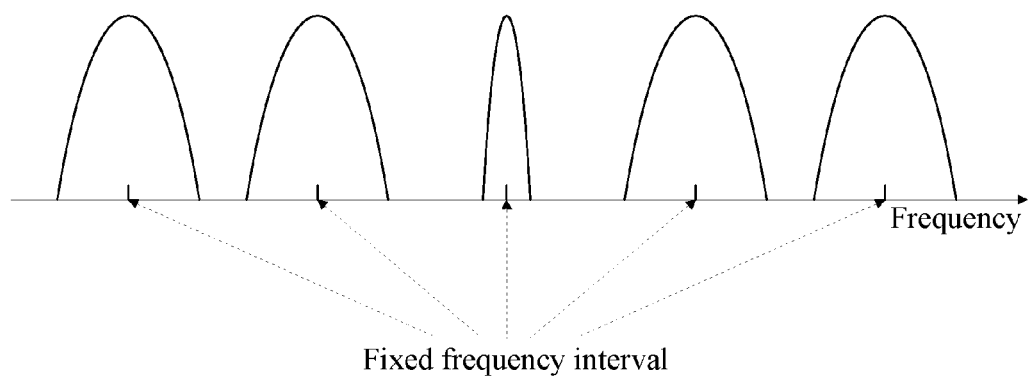
FIG. 1A is a schematic diagram of spectrum allocation in an existing optical communication transmission network.
Figure 1B:
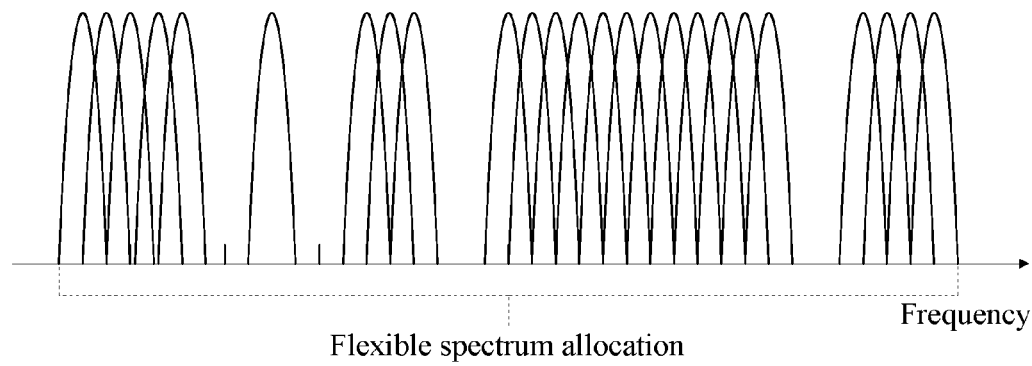
FIG. 1B is a schematic diagram of spectrum allocation in a future optical communication transmission network.
Figure 2:
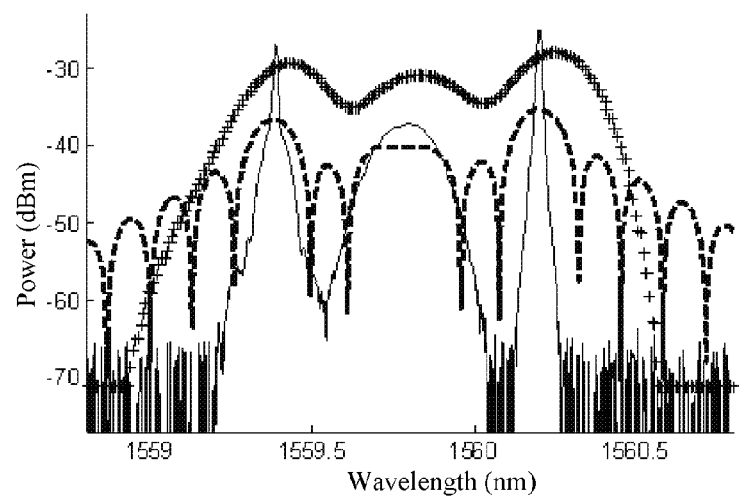
FIG. 2 is a schematic diagram of three types of spectrums that are corresponding to an optical signal transmitted in an optical communication transmission network.
Figure 3:
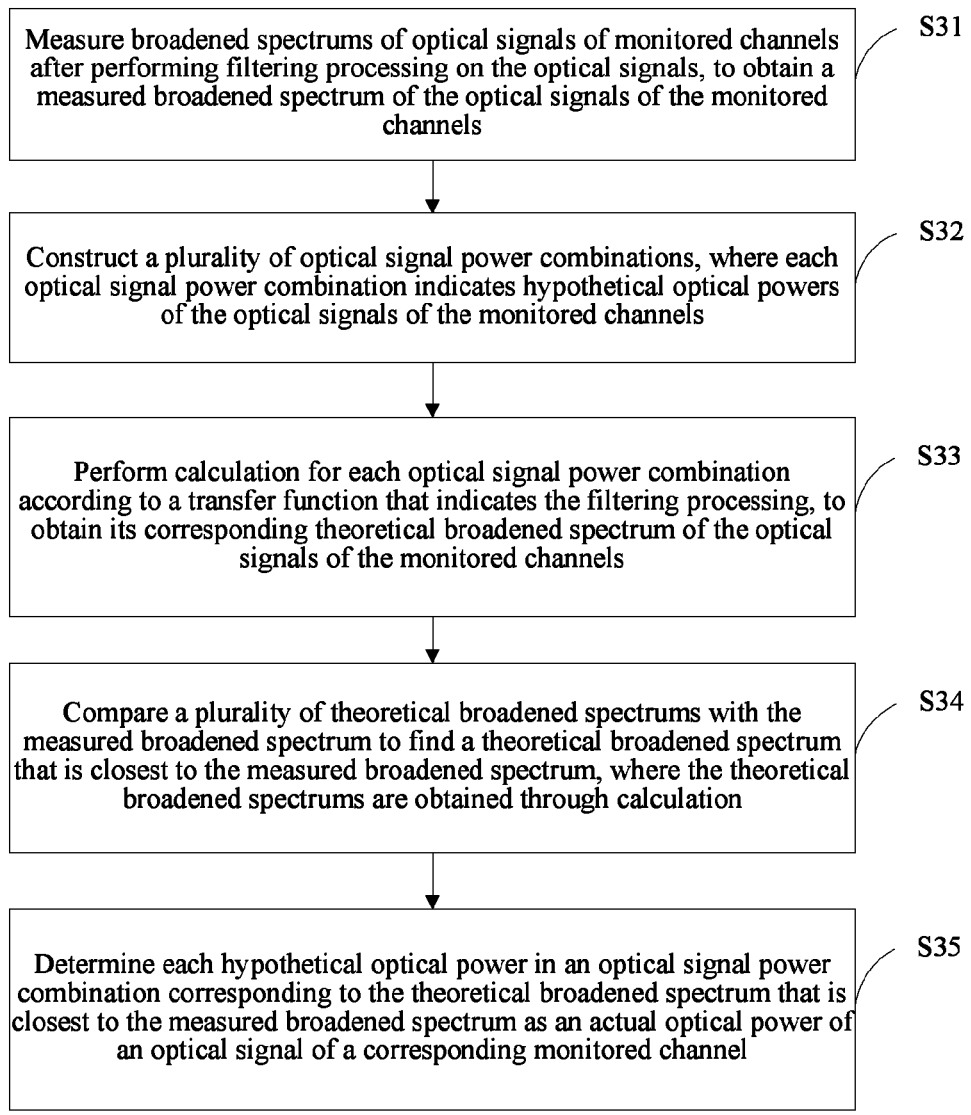
FIG. 3 is a schematic flow chart of an optical power monitoring method according to a first embodiment of the present invention.

An embodiment of the present invention provides an optical power monitoring method. A process is shown in FIG. 3, and the method includes:

Step S31: Measure broadened spectrums of optical signals of monitored channels after performing filtering processing on the optical signals, to obtain a measured broadened spectrum of the optical signals of the monitored channels.

In this step, the filtering processing is performed to distinguish optical signals of monitored channels, so as to facilitate measurement for a spectrum of an optical signal of each channel. Before the filtering processing, spectrums of the optical signals of the monitored channels are called actual spectrums in the present invention; and during the filtering processing, the optical signals of the monitored channels are influenced by the filtering processing, so that spectrums of the optical signals after the filtering processing are called broadened spectrums. In this step, an optical signal after the filtering processing is measured to obtain the broadened spectrum, and the broadened spectrum obtained through measurement is called a measured broadened spectrum.

In this embodiment, a tunable optical filter may be used to implement the filtering processing, so as to distinguish the optical signals of the monitored channels. The tunable optical filter distinguishes optical signals of different channels in terms of time, then a broadened spectrum of an optical signal of each channel is measured after the optical signal passes through the tunable optical filter; and data that is obtained through measurement and is corresponding to the channels is fitted together to obtain a measured broadened spectrum of the optical signals of the monitored channels after the optical signals pass through the tunable optical filter.

In addition to the tunable optical filter that is used to distinguish the optical signals of different channels in terms of time, multiple non-tunable optical filters may also be used to distinguish the optical signals of different channels in terms of space. For example, a combination of a grating and an array detector may be used to distinguish the optical signals of different channels, where the grating herein functions as multiple filters. In addition to the grating, an optical splitter may also be used to divide an optical signal that is to be monitored into multiple parts, and filtering processing is performed on each part by using a filter that is capable of filtering a signal of a certain corresponding channel, so as to distinguish the optical signals of different channels. Then broadened spectrums of distinguished optical signals of channels are measured, and data of all channels is fitted to obtain a measured broadened spectrum of the optical signals of the monitored channels after the optical signals pass through the filter.

The grating may distinguish optical signals of multiple channels and output optical signals of single channels from different output ports at the same time, where the optical signals of the multiple channels are multiplexed together. For an optical signal of one single channel, the grating filters out optical signals of other channels, which functions as filtering processing and falls within the protection scope claimed in this application. Furthermore, a function of a demultiplexer is similar to that of the grating. The demultiplexer may distinguish the optical signals of the monitored channels in terms of space, which also functions as filtering processing for the optical signals of the monitored channels, and should also fall within the protection scope claimed in this application.

Step S32: Construct a plurality of optical signal power combinations, where each optical signal power combination indicates hypothetical optical powers of the optical signals of the monitored channels.

In this step, each optical signal power combination does not indicate actual optical powers of the optical signals of the monitored channels, but is a theoretical hypothesis of a power status of the optical signals of the monitored channels. For example, a possible variation range of a power of an optical signal of one channel is 0 dB to 1 dB, and it can be assumed that the power of the optical signal of the channel may be 0 dB, 0.1 dB, 0.2 dB, . . . , 0.9 dB, or 1 dB.

When the plurality of optical signal power combinations is constructed in this step, a variation step of a power of an optical signal of each channel may be equal to or less than accuracy of optical power monitoring. For example, when optical power monitoring is performed, required accuracy is 0.1 dB, and when the plurality of optical signal power combinations is constructed, the variation step of the power of the optical signal of each channel is 0.1 dB, or the step may be even less, for example, 0.05 dB, and in this way, higher measurement accuracy may be obtained.

Step S33: Perform calculation for each optical signal power combination according to a transfer function that indicates the filtering processing, to obtain its corresponding theoretical broadened spectrum of the optical signals of the monitored channels.

In an embodiment, step S33 may specifically include:

for each optical signal power combination, according to pre-obtained model information of the optical signals of the monitored channels, obtaining its corresponding spectrum of the optical signals of the monitored channels; and performing a convolution operation on a spectrum that is corresponding to each optical signal power combination and the transfer function that indicates the filtering processing, to obtain its corresponding theoretical broadened spectrum of the optical signals of the monitored channels.

In the embodiment, the model information of the optical signals of the monitored channels may include: modulation formats adopted by the optical signals of the channels, center wavelengths of the channels where the optical signals of the channels are located, and channel bandwidths of the channels where the optical signals of the channels are located. Alternatively, the model information of the optical signals of the monitored channels may include spectrum shapes of the optical signals of the monitored channels. It should be understood that, the model information of the optical signals of the monitored channels is not limited to the preceding information, and any information that describes characteristics of the optical signals of the monitored channels may be used as the model information of the optical signals of the monitored channels.

Step S34: Compare a plurality of theoretical broadened spectrums with the measured broadened spectrum to find a theoretical broadened spectrum that is closest to the measured broadened spectrum, where the theoretical broadened spectrums are obtained through calculation.

In an embodiment, this step may specifically include: by using a two-norm optimization or one-norm optimization method, finding the theoretical broadened spectrum from the plurality of theoretical broadened spectrums that is obtained through calculation, where the theoretical broadened spectrum is closest to the measured broadened spectrum that is obtained through measurement in step S31.

Step S35: Determine each hypothetical optical power in an optical signal power combination corresponding to the theoretical broadened spectrum that is closest to the measured broadened spectrum as an actual optical power of an optical signal of a corresponding monitored channel.

It should be noted that, there is no clear sequence between step S31 and steps S32 and S33. Steps S32 and S33 may be performed first, and then step S31 is performed; and step S31 may also be performed at the same time when steps S32 and S33 are performed.

In an embodiment, before step S31, the following steps may further be included:

performing photoelectric conversion on signals that are obtained after filtering processing is performed on the optical signals of the monitored channels; and performing analog-to-digital conversion on signals that are obtained after the photoelectric conversion.

At this time, specifically, step S31 is: based on analog-to-digital-converted signals, measuring and obtaining the measured broadened spectrum of the optical signals of the monitored channels.

To understand the present invention better, a principle of the present invention is further explained in the following.

A broadened spectrum P(k) of an optical signal of a certain channel after the optical signal passes through a tunable optical filter may be expressed as:

$$P(k) = \int_{\lambda_l}^{\lambda_u} H(\lambda, k) S(\lambda) d\lambda \quad (1).$$

$H(\lambda, k)$ is a transfer function of the tunable optical filter at a center wavelength k, $S(\lambda)$ is a spectrum of an optical signal that is input into the tunable optical filter, and $\lambda_l$ and $\lambda_u$ indicates an upper cutoff wavelength and a lower cutoff wavelength of the filter respectively. A broadened spectrum P(k) of a monitored optical signal passing through the filter may be obtained by measuring a signal output by the filter.

If optical power monitoring is performed on optical signals of N channels, power spectrum densities of optical signals transmitted on the N channels are $S_1(\lambda), \ldots,$ and $S_N(\lambda)$ respectively, and center wavelengths of the N channels are $\bar{\lambda}_1, \ldots,$ and $\bar{\lambda}_N$ respectively. For the N monitored channels, a spectrum $S(\lambda)$ in formula (1) may be expressed as:

$$S(\lambda) = \sum_{i=1}^{N} S_i(\lambda - \bar{\lambda}_i) w_i. \quad (2)$$

$w_i$ indicates a power of an optical signal of an $i^{th}$ channel.

A spectrum is formed by a series of relationships between powers and wavelengths, so that formula (2) may be expressed in a format of a discrete matrix to indicate a spectrum of the optical signals of the N channels:

$$S = sw \quad (3).$$

$S = [S(\lambda_1), S(\lambda_2), \ldots, S(\lambda_N)]^T$ is a discrete vector expression of the spectrum $S(\lambda)$ at a wavelength $\lambda_i$, where $i = 1, \ldots,$ and N, and $w = [w_1, w_2, \ldots w_N]$ indicates a power of an optical signal of each channel. A matrix s is a matrix expression of power spectrum densities of the optical signals of the N channels. Each column of the matrix s is a discretization expression of a power spectrum density of an optical signal of each channel. w is a vector expression of powers of the optical signals of the N channels. H is a matrix expression of transfer functions of the tunable optical filter at different center wavelengths. Each row of H indicates a transfer function of the tunable optical filter at a center wavelength. Formula (1) may also be discretely expressed as:

$$P1 = HS = Hsw \quad (4).$$

A measured broadened spectrum obtained by measuring signals that are obtained after the optical signals of the N monitored channels pass through the tunable optical filter is P0, where P0 is a discretized vector expression of a broadened spectrum. In formula (4), multiplying the matrix H by the matrix S reflexes a convolution operation, and the matrix s reflexes the model information of the optical signal of each monitored channel.

Since it is not known that actual spectrums of the optical signals of the monitored channels are unknown, in the present invention, powers of the optical signals of the channels are constructed, and then spectrums of the optical signals of the channels are calculated according to constructed powers of the optical signals of the channels. Since calculated spectrums of the optical signals of the channels may not be actual spectrums of monitored optical signals, the following relationship exists between a theoretical broadened spectrum obtained according to the calculated spectrums of the optical signals of the channels and the measured broadened spectrum:

$$P0 = P1 + n = Hsw + n \quad (5).$$

n is an error vector and is a vector expression of a measurement error of each channel, where a power error of each channel is a difference between a measured power and a theoretically calculated power.

For the present invention, Q sets of optical power combinations may be constructed, that is, there are Q w vectors and may be, represented as $w_1, w_2, \ldots,$ and $w_Q$ respectively. Accordingly, Q theoretical broadened spectrums may be obtained through calculation and may be represented as $P1_1, P1_2, \ldots,$ and $P1_Q$ respectively.

According to formula (5), a theoretical spectrum that is closest to P0 is found from $P1_1, P1_2, \ldots,$ and $P1_Q$, that is, a theoretical broadened spectrum is found, so that an error between the theoretical broadened spectrum and P0 is smallest. Then an optical power combination corresponding to the theoretical spectrum that is closest to P0 is determined as an actual power of the optical signal of each monitored channel.

To find the theoretical broadened spectrum that is closest to P0 from $P1_1, P1_2, \ldots,$ and $P1_Q$, the two-norm optimization method may be used to calculate an optical power combination that is corresponding to the theoretical broadened spectrum that is closest to P0:

$$\hat{w} = \arg_w \|p - HSw\|_2.$$

In addition to the two-norm optimization method, the one-norm optimization method may be used to calculate an optical power combination corresponding to the theoretical broadened spectrum that is closest to P0:

$$\hat{w} = \operatorname*{argmin}_w \|p - HSw\|_1.$$

It may be understood that, how to find the theoretical broadened spectrum that is closest to P0 from $P1_1, P1_2, \ldots,$ and $P1_Q$ is not limited to the preceding two methods.

It should also be noted that, if multiple filters or a grating rather than a tunable optical filter is used to distinguish the optical signals of the monitored channels in terms of space, the matrix H in the preceding principle is a matrix expression of transfer functions of filters that are corresponding to different channels or a matrix expression of a transfer function of the grating.

The present invention is further described in the following with reference to FIG. 4A to FIG. 4G by taking optical power monitoring of optical signals of three channels as a specific example. It may be understood that, the following embodiment is only used to help understand the present invention and should not be understood as a limitation to the present invention.

Figure 4A:
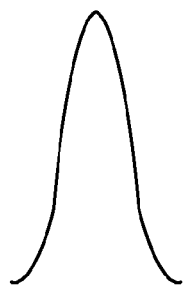
FIG. 4A is a schematic diagram of a transfer function of a tunable optical filter according to the first embodiment of the present invention.
Figure 4B:
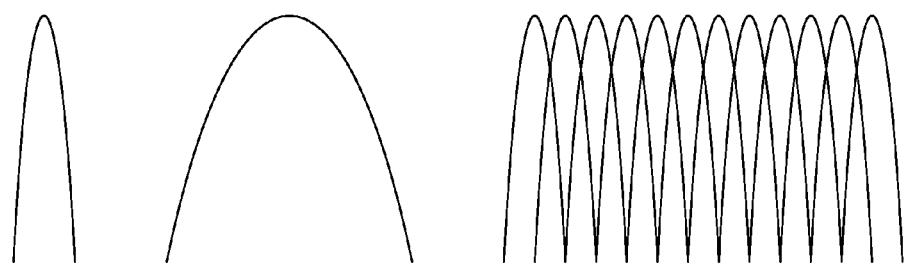
FIG. 4B is a schematic diagram of power spectrum densities of optical signals of three monitored channels according to the first embodiment of the present invention.
Figure 4C:
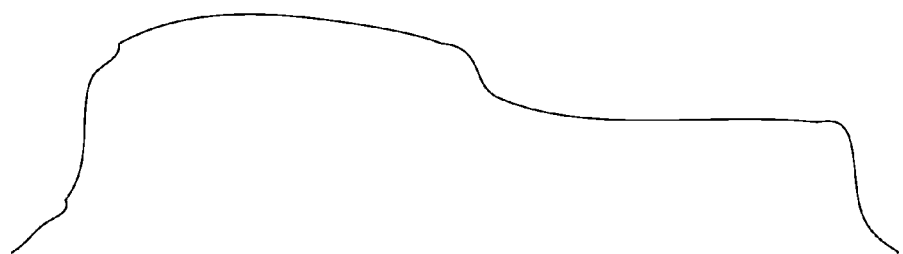
FIG. 4C shows a measured broadened spectrum of the optical signals of the three monitored channels according to the first embodiment of the present invention.

FIG. 4A is a schematic diagram of a transfer function of a tunable optical filter. FIG. 4B is a schematic diagram of power spectrum densities of optical signals of three monitored channels. Shapes of three kinds of power spectrum densities in FIG. 4B reflects that modulation formats and bandwidths of the optical signals of the three monitored channels are different. FIG. 4C shows a measured broadened spectrum obtained by measuring signals after the optical signals of the three monitored channels pass through a tunable filter.

Figure 4D:
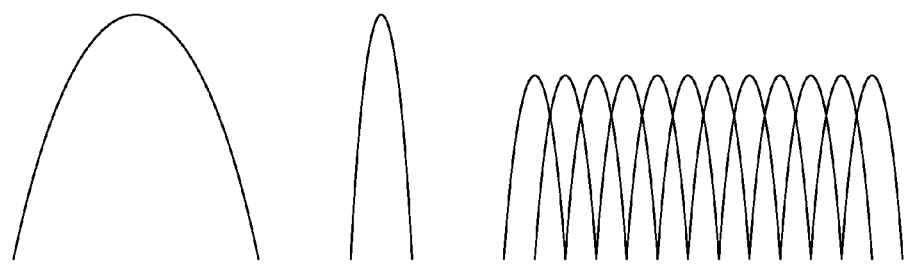
FIG. 4D shows a spectrum of optical signals of three channels corresponding to a first optical power combination according to the first embodiment of the present invention.
Figure 4E:
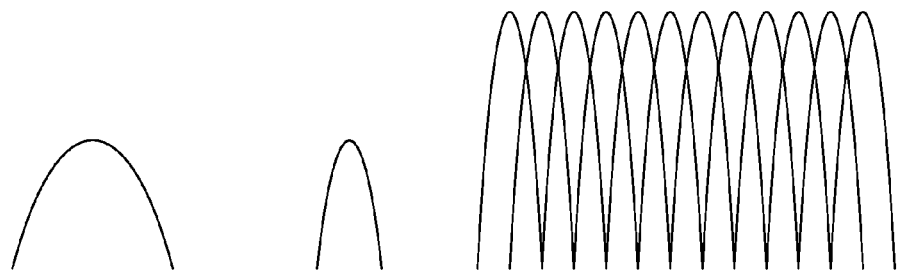
FIG. 4E shows a spectrum of optical signals of three channels corresponding to a second optical power combination according to the first embodiment of the present invention.
Figure 4F:
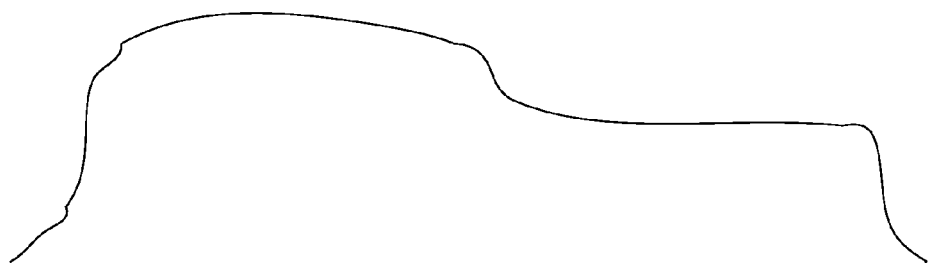
FIG. 4F shows a theoretical broadened spectrum of the optical signals of the three channels corresponding to the first optical power combination according to the first embodiment of the present invention.
Figure 4G:
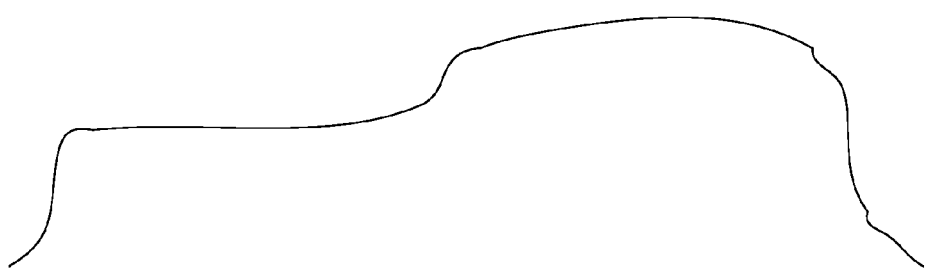
FIG. 4G shows a theoretical broadened spectrum of the optical signals of the three channels corresponding to the second optical power combination according to the first embodiment of the present invention.

In this embodiment, powers of the optical signals of the three monitored channels are hypothesized, two kinds of optical power combinations (each kind of optical power combination indicates a hypothetical situation of powers of the optical signals of the three monitored channels) are constructed, and two kinds of spectrums of the optical signals of the three monitored channels are accordingly obtained according to the preceding formula (2) or (3), as shown in FIG. 4D (corresponding to a first kind of optical power combination) and FIG. 4E (corresponding to a second kind of optical power combination). Based on a spectrum shown in FIG. 4D, calculation is performed according to formula (4) to obtain a theoretical broadened spectrum that is corresponding to the first kind of optical power combination, as shown in FIG. 4F. Based on a spectrum shown in FIG. 4E, calculation is performed according to formula (4) to obtain a theoretical broadened spectrum that is corresponding to the second kind of optical power combination, as shown in FIG. 4G. The theoretical broadened spectrums shown in FIG. 4F and FIG. 4G are compared with an actual broadened spectrum shown in FIG. 4C, and it is found that the theoretical broadened spectrum shown in FIG. 4F is closer to the actual broadened spectrum shown in FIG. 4C, and therefore, the first kind of optical power combination corresponding to FIG. 4F is determined as an actual power combination of the optical signals of the three monitored channels.

With the optical power monitoring method provided in this embodiment of the present invention, the plurality of optical power combinations of the optical signals of the monitored channels is constructed, calculation is performed based on the plurality of constructed optical power combinations to obtain multiple theoretical broadened spectrums that are corresponding to the optical signals of the monitored channels, and then the plurality of theoretical broadened spectrums is compared with the measured broadened spectrum to find a theoretical broadened spectrum that is closest to the measured broadened spectrum, and each power in an optical power combination corresponding to the theoretical spectrum that is closest to the measured broadened spectrum is determined as an actual optical power of an optical signal of a corresponding monitored channel. No deconvolution operation is required to restore a spectrum of the optical signals of the monitored channels, so that a monitoring error caused by a larger difference between a restored spectrum and a real spectrum is avoided, and therefore, accuracy of optical power monitoring may be improved and a requirement for filter performance is lowered, thereby reducing a monitoring cost. Especially, the solutions are applicable in a variable-bandwidth optical-communication transmission network without a similar disadvantage that exists when an existing optical power monitoring technology is applied in the variable-bandwidth optical-communication transmission network.

Embodiment 2

Figure 5A:
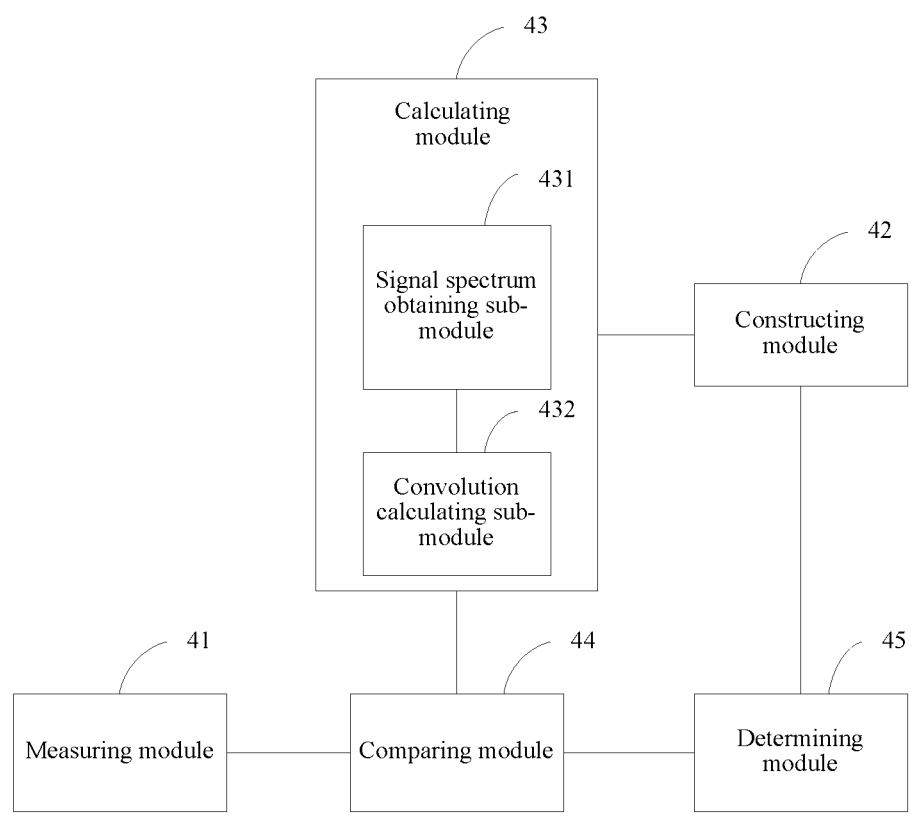
FIG. 5A is a schematic structural diagram of an optical power monitoring apparatus according to a second embodiment of the present invention.

Corresponding to the optical power monitoring method provided in the first embodiment, this embodiment provides an optical power monitoring apparatus, and a structure of the optical power monitoring apparatus is shown in FIG. 5A, The apparatus includes: a measuring module 41, a constructing module 42, a calculating module 43, a comparing module 44, and a determining module 45.

The measuring module 41 is configured to measure broadened spectrums of optical signals of monitored channels after performing filtering processing on the optical signals, to obtain a measured broadened spectrum of the optical signal of the monitored channels.

The constructing module 42 is configured to construct a plurality of optical signal power combinations. Each optical signal power combination indicates hypothetical optical powers of the optical signals of the monitored channels.

The calculating module 43 is configured to, perform calculation for each optical signal power combination according to a transfer function that indicates the filtering processing, to obtain its corresponding theoretical broadened spectrum of the optical signals of the monitored channels.

The comparing module 44 is configured to compare a plurality of theoretical broadened spectrums with the measured broadened spectrum that is measured and obtained by the measuring module 41 to find a theoretical broadened spectrum that is closest to the measured broadened spectrum, where the theoretical broadened spectrums are obtained through calculation performed by the calculating module 43.

The determining module 45 is configured to determine each hypothetical optical power in an optical signal power combination corresponding to the theoretical broadened spectrum that is closest to the measured broadened spectrum and found by the comparing module 44 as an actual power of an optical signal of a corresponding monitored channel.

In an embodiment, the calculating module 43 may specifically include:

A signal spectrum obtaining sub-module 431 is configured to: for each optical signal power combination, according to pre-obtained model information of the optical signals of the monitored channels, obtain its corresponding spectrum of the optical signals of the monitored channels. The model information of the optical signals of the monitored channels may include: modulation formats adopted by the optical signals of the channels, center wavelengths of the channels where the optical signals of the channels are located, and channel bandwidths of the channels where the optical signals of the channels are located. Alternatively, the model information of the optical signals of the monitored channels may include spectrum shapes of the optical signals of the monitored channels. It should be understood that, the model information of the optical signals of the monitored channels is not limited to the preceding information, and any information that describes characteristics of the optical signals of the monitored channels may be used as the model information of the optical signals of the monitored channels.

A convolution calculating sub-module 432 is configured to perform a convolution operation on a spectrum that is corresponding to each optical signal power combination and the transfer function that indicates the filtering processing, to obtain its corresponding theoretical broadened spectrum of the optical signals of the monitored channels.

Figure 5B:
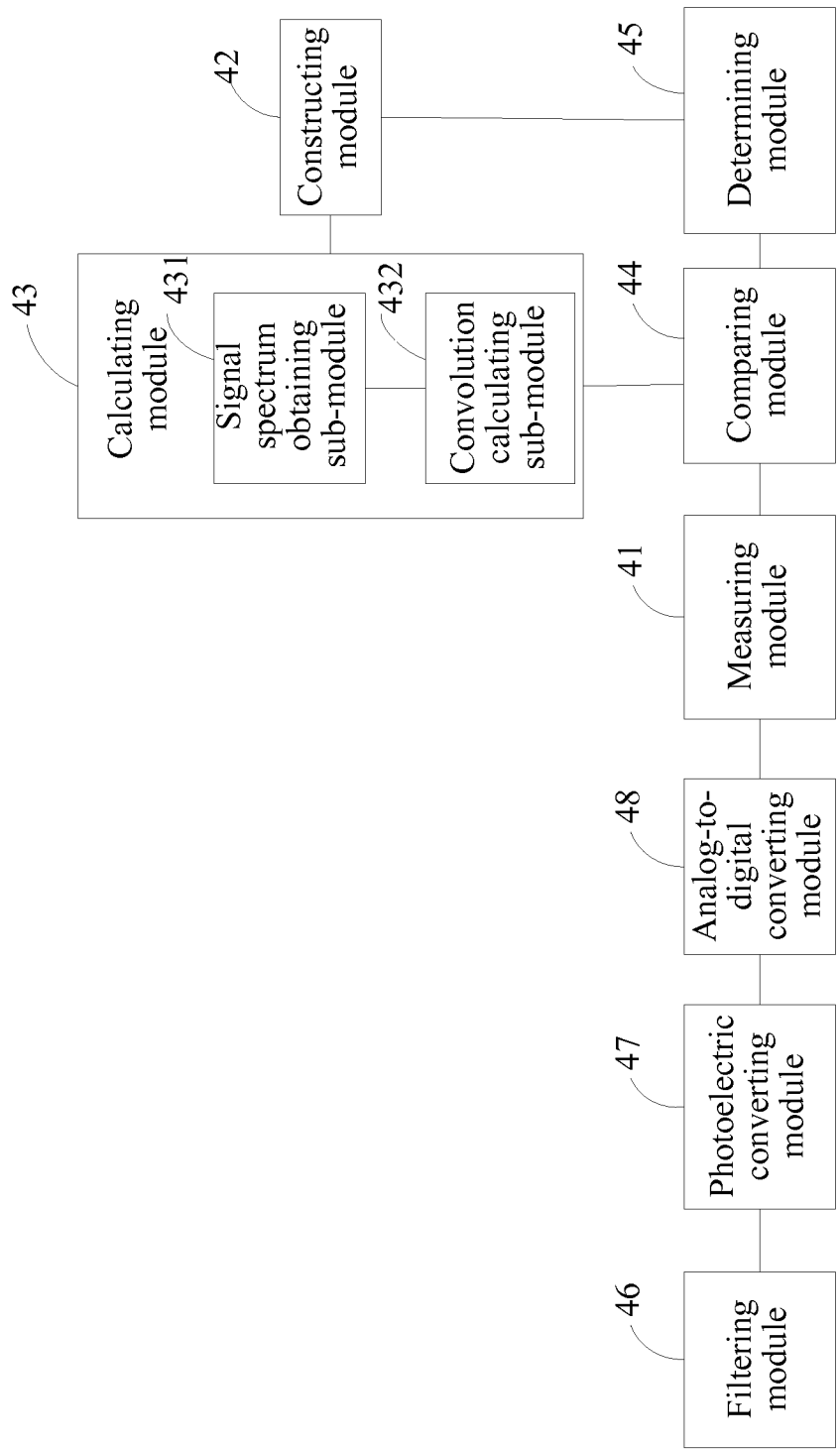
FIG. 5B is a schematic structural diagram of another optical power monitoring apparatus according to the second embodiment of the present invention.

In another embodiment, referring to FIG. 5B, on the basis of the structure of the apparatus show in FIG. 5A, the optical power monitoring apparatus provided in the present invention may further include a filtering module 46, a photoelectric converting module 47, and an analog-to-digital converting module 48.

The filtering module 46 is configured to filter signals of monitored channels. The filtering module 46 may be a tunable optical filter, may also be a non-tunable optical filter, and may also be a grating or an optical demultiplexer, where the grating or the optical demultiplexer is similar to a filter and has a signal separation function.

The photoelectric converting module 47 is configured to perform photoelectric conversion on optical signals output by the filtering module 46.

The analog-to-digital converting module 48 is configured to perform analog-to-digital conversion on signals output by the photoelectric converting module 47.

The measuring module 41 performs measurement based on signals output by the analog-to-digital converting module 48 to obtain a measured broadened spectrum of the optical signals of the monitored channels after the optical signals are filtered.

For a principle of a processing process of each module in this embodiment, reference may be made to a relevant description in the first embodiment, and is not described here again.

An embodiment of the present invention further provides a processor, which is configured to perform the following method:

measuring broadened spectrums of optical signals of monitored channels after performing filtering processing on the optical signals, to obtain a measured broadened spectrum of the optical signals of the monitored channels;

constructing a plurality of optical signal power combinations, where each optical signal power combination indicates hypothetical optical powers of the optical signals of the monitored channels;

performing calculation for each optical signal power combination according to a transfer function that indicates the filtering processing, to obtain its corresponding theoretical broadened spectrum of the optical signals of the monitored channels;

comparing a plurality of theoretical broadened spectrums with the measured broadened spectrum to find a theoretical broadened spectrum that is closest to the measured broadened spectrum, where the theoretical broadened spectrums are obtained through calculation; and determining each hypothetical optical power in an optical signal power combination corresponding to the theoretical broadened spectrum that is closest to the measured broadened spectrum as an actual optical power of an optical signal of a corresponding monitored channel.

The performing calculation for each optical signal power combination according to the transfer function that indicates the filtering processing, to obtain its corresponding theoretical broadened spectrum of the optical signals of the monitored channels may specifically include:

for each optical signal power combination, according to pre-obtained model information of the optical signals of the monitored channels, obtaining its corresponding spectrum of the optical signals of the monitored channels; and performing a convolution operation on a spectrum that is corresponding to each optical signal power combination and the transfer function that indicates the filtering processing, to obtain its corresponding theoretical broadened spectrum of the optical signals of the monitored channels.

The model information of the optical signals of the monitored channels may include: modulation formats adopted by the optical signals of the channels, center wavelengths of the channels where the optical signals of the channels are located, and channel bandwidths of the channels where the optical signals of the channels are located. Alternatively, the model information of the optical signals of the monitored channels may include spectrum shapes of the optical signals of the monitored channels. It should be understood that, the model information of the optical signals of the monitored channels is not limited to the preceding information, and any information that describes characteristics of the optical signals of the monitored channels may be used as the model information of the optical signals of the monitored channels.

The processor may be applied to optical power monitoring and may specifically be a device such as a DSP or a CPU.

With the optical power monitoring apparatus or the processor provided in this embodiment of the present invention, the plurality of optical power combinations of the optical signals of the monitored channels is constructed, calculation is performed based on the constructed plurality of optical power combinations to obtain multiple theoretical broadened spectrums that are corresponding to the optical signals of the monitored channels, and then the multiple theoretical broadened spectrums are compared with the measured broadened spectrum to find a theoretical broadened spectrum that is closest to the measured broadened spectrum, and each power in an optical power combination corresponding to the theoretical spectrum that is closest to the measured broadened spectrum is determined as an actual optical power combination of an optical signal of a corresponding monitored channel. No deconvolution operation is required to restore a spectrum of the optical signals of the monitored channels, so that a monitoring error caused by a larger difference between a restored spectrum and a real spectrum is avoided, and therefore, accuracy of optical power monitoring may be improved and a requirement for filter performance is lowered, thereby reducing a monitoring cost. Especially, the solutions are applicable in a variable-bandwidth optical-communication transmission network without a similar disadvantage that exists when an existing optical power monitoring technology is applied in the variable-bandwidth optical-communication transmission network.

Through the preceding description of the embodiments, persons of ordinary skill in the art may clearly understand that the present invention may be implemented by software plus necessary universal hardware, and definitely may also be implemented by hardware, but in most cases, the former is a preferable implementation manner. Based on this understanding, the essence of the technical solutions of the present invention or the part that makes contributions to the prior art may be embodied in the form of a software product. The computer software product may be stored in a computer readable storage medium such as a floppy disk, a hard disk, or an optical disk of a computer, and includes several instructions to instruct a piece of computer equipment (may be a personal computer, a server, or network equipment) to perform the method described in each embodiment of the present invention. The preceding descriptions are only specific embodiments of the present invention, but are not intended to limit the protection scope of the present invention. Any change or replacement that may be easily thought of by persons skilled in the art within the technical scope disclosed by the present invention shall fall within the protection scope of the present invention. Therefore, the protection scope of the present invention shall be subject to the protection scope of the claims.

What is claimed is:

1. An optical power monitoring method, comprising:
measuring broadened spectrums of optical signals of monitored channels after performing filtering processing on the optical signals, to obtain a measured broadened spectrum of the optical signals of the monitored channels;
constructing a plurality of optical signal power combinations, wherein each optical signal power combination indicates hypothetical optical powers of the optical signals of the monitored channels;
performing calculation for each optical signal power combination according to a transfer function that indicates the filtering processing, to obtain its corresponding theoretical broadened spectrum of the optical signals of the monitored channels;
comparing a plurality of theoretical broadened spectrums with the measured broadened spectrum to find a theoretical broadened spectrum that is closest to the measured broadened spectrum, wherein the theoretical broadened spectrums are obtained through calculation; and
determining each hypothetical optical power in an optical signal power combination corresponding to the theoretical broadened spectrum that is closest to the measured broadened spectrum as an actual optical power of an optical signal of a corresponding monitored channel.

2. The method according to claim 1, wherein the performing calculation for each optical signal power combination according to the transfer function that indicates the filtering processing, to obtain its corresponding theoretical broadened spectrum of the optical signals of the monitored channels comprises:
for each optical signal power combination, according to pre-obtained model information of the optical signals of the monitored channels, obtaining its corresponding spectrum of the optical signals of the monitored channels; and
performing a convolution operation on a spectrum that is corresponding to each optical signal power combination and the transfer function that indicates the filtering processing, to obtain its corresponding theoretical broadened spectrum of the optical signals of the monitored channels.

3. The method according to claim 2, wherein the model information of the optical signals of the monitored channels comprises: modulation formats adopted by the optical signals of the channels, center wavelengths of the channels where the optical signals of the channels are located, and channel bandwidths of the channels where the optical signals of the channels are located.

4. The method according to claim 2, wherein the model information of the optical signals of the monitored channels comprises spectrum shapes of the optical signals of the monitored channels.

5. The method according to claim 1, wherein the comparing the plurality of theoretical broadened spectrums with the measured broadened spectrum to find the theoretical broadened spectrum that is closest to the measured broadened spectrum, wherein the theoretical broadened spectrums are obtained through calculation, specifically comprises:
by using a two-norm optimization or one-norm optimization method, finding the theoretical broadened spectrum that is closest to the measured broadened spectrum from the plurality of theoretical broadened spectrums that is obtained through calculation.

6. The method according to claim 1, wherein when the plurality of optical signal power combinations is constructed, a variation step of a power of an optical signal of each channel is equal to or less than measurement accuracy that is required for optical power monitoring.

7. The method according to claim 1, wherein before the measuring the broadened spectrums of the optical signals of the monitored channels after performing filtering processing on the optical signals, to obtain the measured broadened spectrum of the optical signals of the monitored channels, the method further comprises:
performing photoelectric conversion on signals that are obtained after filtering processing is performed on the optical signals of the monitored channels; and
performing analog-to-digital conversion on signals that are obtained after the photoelectric conversion,
wherein the measuring the broadened spectrums of the optical signals of the monitored channels after the optical signals pass through a filter specifically is: based on analog-to-digital-converted signals, measuring and obtaining the measured broadened spectrum of the optical signals of the monitored channels.

8. An optical power monitoring apparatus, wherein the apparatus comprises:
a measuring module, configured to measure broadened spectrums of optical signals of monitored channels after performing filtering processing on the optical signals, to obtain a measured broadened spectrum of the optical signals of the monitored channels;
a constructing module, configured to construct a plurality of optical signal power combinations, wherein each optical signal power combination indicates hypothetical optical powers of the optical signals of the monitored channels;

a calculating module, configured to, perform calculation for each optical signal power combinations according to a transfer function that indicates the filtering processing, to obtain its corresponding theoretical broadened spectrum of the optical signals of the monitored channels;

a comparing module, configured to compare a plurality of theoretical broadened spectrums with the measured broadened spectrum to find a theoretical broadened spectrum that is closest to the measured broadened spectrum, wherein the theoretical broadened spectrums are obtained through calculation performed by the calculating module; and a determining module, configured to determine each hypothetical optical power in an optical signal power combination corresponding to the theoretical broadened spectrum that is closest to the measured broadened spectrum as an actual optical power of an optical signal of a corresponding monitored channel.

9. The apparatus according to claim 8, wherein the calculating module specifically comprises:

a signal spectrum obtaining sub-module, configured to: for each optical signal power combination, according to pre-obtained model information of the optical signals of the monitored channels, obtain its corresponding spectrum of the optical signals of the monitored channels; and a convolution calculating sub-module, configured to perform a convolution operation on a spectrum that is corresponding to each optical signal power combination and the transfer function that indicates the filtering processing, to obtain its corresponding theoretical broadened spectrum of the optical signals of the monitored channels.

10. The apparatus according to claim 8, wherein, the apparatus further comprises:

a filtering module, configured to perform filtering processing on the optical signals of the monitored channels, so as to distinguish the optical signals of the channels;

a photoelectric converting module, configured to perform photoelectric conversion on optical signals output by the filtering module; and an analog-to-digital converting module, configured to perform analog-to-digital conversion on signals output by the photoelectric converting module, wherein the measuring module is specifically configured to, based on signals output by the analog-to-digital converting module, calculate and obtain the measured broadened spectrum of the optical signals of the monitored channels.

* * * * *